US012378889B2

(12) United States Patent
Noeth et al.

(10) Patent No.: US 12,378,889 B2
(45) Date of Patent: Aug. 5, 2025

(54) TURBINE ENGINE WITH A BLADE ASSEMBLY HAVING COOLING CONDUITS (71) Applicant: General Electric Company, Evendale, OH (US)

(72) Inventors: Zachary R. Noeth, Loveland, OH (US); Thomas P. Warburg, West Chester, OH (US); Zachary Daniel Webster, Liberty Township, OH (US); Kelli Marie Fishback, Liberty Township, OH (US); Marie Myers, Cincinnati, OH (US); Kurt Thomas Whittington, Maineville, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/941,684

(22) Filed: Nov. 8, 2024

(65) Prior Publication Data

US 2025/0154873 A1 May 15, 2025

Related U.S. Application Data (60) Provisional application No. 63/686,037, filed on Aug. 22, 2024, provisional application No. 63/597,828, filed on Nov. 10, 2023.

(51) Int. Cl.
F01D 5/18 (2006.01)
F01D 5/14 (2006.01)

(52) U.S. Cl.
CPC ............. *F01D 5/186* (2013.01); *F01D 5/147* (2013.01); *F05D 2220/3212* (2013.01); *F05D 2240/304* (2013.01); *F05D 2240/80* (2013.01)

(58) Field of Classification Search
CPC .......... F01D 5/186; F01D 5/187; F01D 5/147; F05D 2260/202; F05D 2240/304
See application file for complete search history.

(56) References Cited

U.S. PATENT DOCUMENTS

| 5,413,456 | A | 5/1995 | Kulak et al. |
| 5,413,458 | A | 5/1995 | Calderbank |
| 5,464,322 | A | 11/1995 | Cunha et al. |
| 6,234,754 | B1 * | 5/2001 | Zelesky ............... B22C 9/10 415/115 |
| 6,672,836 | B2 | 1/2004 | Merry |
| 6,988,872 | B2 | 1/2006 | Soechting et al. |
| 7,147,440 | B2 | 12/2006 | Benjamin et al. |

(Continued)

OTHER PUBLICATIONS

European Patent Office, "Extended European Search Report," issued in connection with European Patent Application No. 24211801.6, dated Mar. 20, 2025, 12 pages.

(Continued)

*Primary Examiner* — Eldon T Brockman
(74) *Attorney, Agent, or Firm* — Hanley, Flight & Zimmerman, LLC (57) ABSTRACT A gas turbine engine having a blade assembly with a platform, an airfoil, and a shank. The airfoil has a plurality of cooling conduits, and the shank has a plurality of inlet passages to provide cooling fluid to the cooling conduits in the airfoil. The cooling fluid is vented through a plurality of cooling holes along the trailing edge of the airfoil. The blade assembly has specific geometries that improve durability.

20 Claims, 7 Drawing Sheets

(56) References Cited

U.S. PATENT DOCUMENTS

| | | | |
|---|---|---|---|
| 7,438,527 B2 * | 10/2008 | Albert | B22C 9/103 |
| | | | 416/97 R |
| 7,722,326 B2 | 5/2010 | Beeck et al. | |
| 8,864,444 B2 | 10/2014 | Antunes et al. | |
| 9,121,292 B2 | 9/2015 | Zhang et al. | |
| 9,145,780 B2 | 9/2015 | Propheter-Hinckley et al. | |
| 10,301,946 B2 | 5/2019 | Weber et al. | |
| 10,519,782 B2 | 12/2019 | Clum et al. | |
| 2022/0098988 A1 | 3/2022 | LoRicco et al. | |

OTHER PUBLICATIONS

European Patent Office, "Extended European Search Report," issued in connection with European Patent Application No. 24211828.9, dated Mar. 20, 2025, 12 pages.

* cited by examiner

TURBINE ENGINE WITH A BLADE ASSEMBLY HAVING COOLING CONDUITS

CROSS-REFERENCE TO RELATED APPLICATIONS

This patent claims the benefit of U.S. Provisional Patent Application No. 63/597,828, titled "TURBINE ENGINE WITH A BLADE ASSEMBLY HAVING A SET OF COOLING CONDUITS," which was filed on Nov. 10, 2023, and U.S. Provisional Patent Application No. 63/686,037, titled "TURBINE ENGINE WITH A BLADE ASSEMBLY HAVING COOLING CONDUITS," which was filed on Aug. 22, 2024. U.S. Provisional Patent Application Nos. 63/597,828 and 63/686,037 are hereby incorporated herein by reference in its entirety. Priority to U.S. Provisional Patent Application Nos. 63/597,828 and 63/686,037 is hereby claimed.

TECHNICAL FIELD

The present subject matter relates generally to a blade assembly for a turbine engine, and more specifically to a blade assembly with cooling conduits located within.

BACKGROUND

A gas turbine engine typically includes a turbomachine, with a fan in some implementations. The turbomachine generally includes a compressor, combustor, and turbine in serial flow arrangement. The compressor compresses air which is channeled to the combustor where it is mixed with fuel. The mixture is then ignited to generate hot combustion gases. The combustion gases are channeled to the turbine, which extracts energy from the combustion gases for powering the compressor and fan, if used, as well as for producing useful work to propel an aircraft in flight or to power a load, such as an electrical generator.

During operation of the gas turbine engine, various systems generate a relatively large amount of heat and stress. For example, a substantial amount of heat or stress can be generated during operation of the thrust generating systems, lubrication systems, electric motors and/or generators, hydraulic systems or other systems. A design that mitigates heat loads and/or stresses on an engine component is advantageous.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to a blade assembly having conduits located within the blade assembly. Specifically, the blade assembly includes an airfoil with a plurality of cooling conduits. The airfoil also includes cooling holes fluidly coupled to the plurality of cooling conduits within the airfoil.

The blade assembly may be a blade assembly in a turbine section of a gas turbine engine. For example, the blade assembly may be a stage one blade assembly of a high pressure turbine, which typically experiences the highest thermal and mechanical stresses.

The blade assembly includes a shank and a platform. The shank is used to attach the blade assembly to a turbine disk. In some implementations the shank is formed as a dovetail received in the turbine disk.

The platform of the blade assembly together with other circumferentially arranged platforms and seals of other blade assemblies define a substantially continuous annular ring that limits (e.g., prevents, reduces) hot gas leakage from the flow path into the turbine disk cavity. The airfoil extends radially from the platform, away from the turbine disk, while the shank extends radially from the platform, toward the turbine disk.

High engine temperatures and operational forces impart relatively large thermal and mechanical stresses on the blade assemblies. In addition, the cooling conduits in the blade assembly create stress concentrations. For example, the size of the cooling conduits affects the thickness of the airfoil wall, which affects stress concentrations in the airfoil. Relatively large stresses can contribute to an unexpected or premature part replacement. Therefore, there is a need for a blade assembly with greater durability to increase time on wing.

Connection references (e.g., attached, coupled, connected, and joined) are to be construed broadly and can include intermediate structural elements between a collection of elements and relative movement between elements unless otherwise indicated. As such, connection references do not necessarily infer those two elements are directly connected and in fixed relation to one another. The exemplary drawings are for purposes of illustration only and the dimensions, positions, order and relative sizes reflected in the drawings attached hereto can vary.

As used herein, a "stage" of either a compressor or a turbine of a gas turbine engine is a set of blade assemblies and an adjacent set of vane assemblies, with both sets of the blade assemblies and the vane assemblies circumferentially arranged about an engine centerline. A pair of circumferentially-adjacent vanes in the set of vane assemblies are referred to as a nozzle. The blade assemblies rotate relative to the engine centerline and, in one example, are mounted to a rotating structure, such as a disk, to affect the rotation.

As used herein, the word "exemplary" means "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", "third", and "fourth" can be used interchangeably to distinguish one component from another and are not intended to signify location or importance of the individual components.

As used herein, a "set" or a set of elements can include any number of said elements, including one.

As used herein, the terms "forward" and "aft" refer to relative positions within a gas turbine engine and refer to the normal operational attitude or direction of travel of the gas turbine engine. For example, with regard to a gas turbine engine, forward refers to a position relatively closer to the nose of an aircraft and aft refers to a position relatively closer to a tail of the aircraft.

As used herein, the terms "upstream" and "downstream" refer to a direction with respect to a direction of fluid flow along a flowpath.

As used herein, the term "fluid" refers to a gas or a liquid and "fluidly coupled" means a fluid can flow between the coupled regions.

As used herein, forms "a", "an", and "the" include plural references unless the context clearly dictates otherwise.

As used herein, a radial direction (denoted "R") is a direction that is perpendicular to a base plane on a shank of a blade assembly.

As used herein, an axial direction (denoted "A") is a direction that is perpendicular to a shank leading-edge plane on the shank of the blade assembly.

As used herein, a tangential direction (denoted "T") is a direction that is perpendicular to the radial direction and the axial direction.

A trailing-edge area (denoted "TEA") is an average cross-sectional area of a trailing-edge cooling conduit closest to a trailing-edge of the airfoil taken at two cross-sectional planes that are at two different radial distances from a base plane of a blade assembly.

A secondary area ("SA") is an average cross-sectional area of a second cooling conduit next to the trailing-edge cooling conduit taken at two cross-sectional planes that are at two different radial distances from a base plane of a blade assembly.

A stator rotor seal radius (denoted "SRSR") is a radius of curvature of an upper edge of a stator rotor seal on a blade assembly.

The term redline exhaust gas temperature (referred to herein as "redline EGT") refers to a maximum permitted takeoff temperature documented in a Federal Aviation Administration ("FAA")-type certificate data sheet. For example, in certain exemplary embodiments, the term redline EGT may refer to a maximum permitted takeoff temperature of an airflow after a first stage stator downstream of an HP turbine of an engine that the engine is rated to withstand. The term redline EGT is sometimes also referred to as an indicated turbine exhaust gas temperature or indicated turbine temperature.

All measurements referred to herein are taken of the blade assembly prior to use or as a cold component.

Figure 1:
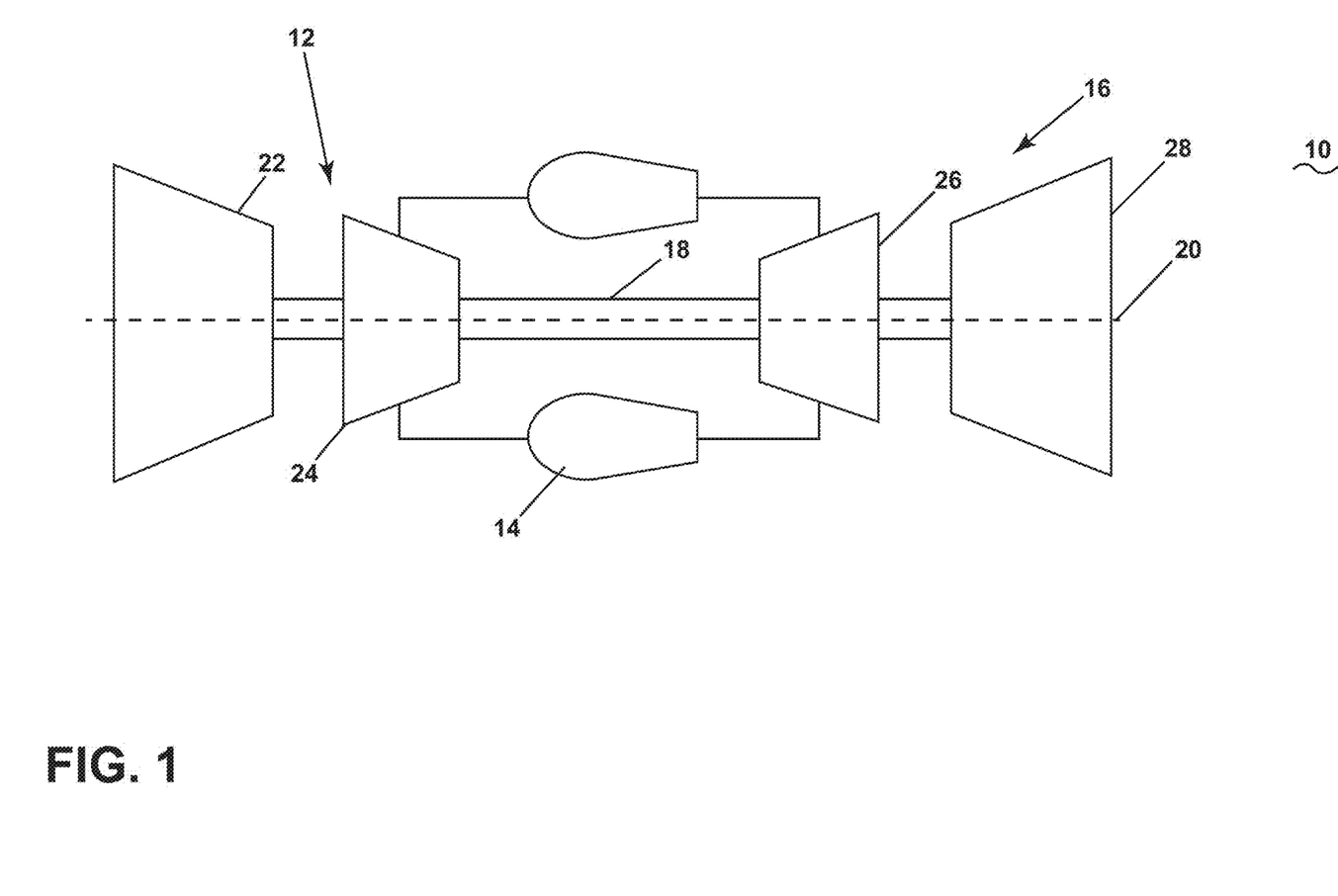
FIG. 1 is a schematic cross-sectional view of a gas turbine engine, in accordance with an exemplary embodiment of the present disclosure.

Referring now to the drawings, FIG. 1 is a schematic view of a gas turbine engine 10. As a non-limiting example, the gas turbine engine 10 can be used on an aircraft. The gas turbine engine 10 includes an engine core extending along an engine centerline 20 and including, at least, a compressor section 12, a combustor 14, and a turbine section 16 in serial flow arrangement. In some examples, the gas turbine engine 10 includes a fan (not shown) that is driven by the engine core to produce thrust and provide air to the compressor section 12. The gas turbine engine 10 includes a drive shaft 18 that rotationally couples the fan, compressor section 12, and turbine section 16, such that rotation of one affects the rotation of the others, and defines a rotational axis along the engine centerline 20 of the gas turbine engine 10.

In the illustrated example, the compressor section 12 includes a low-pressure (LP) compressor 22 and a high-pressure (HP) compressor 24 serially fluidly coupled to one another. The turbine section 16 includes an HP turbine 26 and an LP turbine 28 serially fluidly coupled to one another. The drive shaft 18 operatively couples the LP compressor 22, the HP compressor 24, the HP turbine 26 and the LP turbine 28 to one another. In some implementations, the drive shaft 18 includes an LP drive shaft (not illustrated) and an HP drive shaft (not illustrated), where the LP drive shaft couples the LP compressor 22 to the LP turbine 28, and the HP drive shaft couples the HP compressor 24 to the HP turbine 26.

The compressor section 12 includes a plurality of axially spaced stages. Each stage includes a set of circumferentially-spaced rotating blade assemblies and a set of circumferentially-spaced stationary vane assemblies. In one configuration, the compressor blade assemblies for a stage of the compressor section 12 are mounted to a disk, which is mounted to the drive shaft 18. Each set of blade assemblies for a given stage can have its own disk. In one implementation, the vane assemblies of the compressor section 12 are mounted to a casing which extends circumferentially about the gas turbine engine 10. In a counter-rotating turbine engine, the vane assemblies are mounted to a drum, which is similar to the casing, except the drum rotates in a direction opposite the blade assemblies, whereas the casing is stationary. It will be appreciated that the representation of the compressor section 12 is merely schematic. The number of stages can vary.

Similar to the compressor section 12, the turbine section 16 includes a plurality of axially spaced stages, with each stage having a set of circumferentially-spaced, rotating blade assemblies and a set of circumferentially-spaced, stationary vane assemblies. In one configuration, the turbine blade assemblies for a stage of the turbine section 16 are mounted to a disk which is mounted to the drive shaft 18. Each set of blade assemblies for a given stage can have its own disk. In one implementation, the vane assemblies of the turbine section are mounted to the casing in a circumferential manner. In a counter-rotating turbine engine, the vane assemblies can be mounted to a drum, which is similar to the casing, except the drum rotates in a direction opposite the blade assemblies, whereas the casing is stationary. The number of blade assemblies, vane assemblies, and turbine stages can vary.

The combustor 14 is provided serially between the compressor section 12 and the turbine section 16. The combustor 14 is fluidly coupled to at least a portion of the compressor section 12 and the turbine section 16 such that the combustor 14 at least partially fluidly couples the compressor section 12 to the turbine section 16. As a non-limiting example, the combustor 14 is fluidly coupled to the HP compressor 24 at an upstream end of the combustor 14 and to the HP turbine 26 at a downstream end of the combustor 14.

During operation of the gas turbine engine 10, ambient or atmospheric air is drawn into the compressor section 12 via the fan, upstream of the compressor section 12, where the air is compressed defining a pressurized air. The pressurized air then flows into the combustor 14 where the pressurized air is mixed with fuel and ignited, thereby generating hot combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the gas turbine engine 10 via an exhaust section (not illustrated) downstream of the turbine section 16. The driving of the LP turbine 28 drives the LP spool to rotate the fan and the LP compressor 22. The pressurized airflow and the combustion gases together define a working airflow that flows through the fan, compressor section 12, combustor 14, and turbine section 16 of the gas turbine engine 10.

Figure 2:
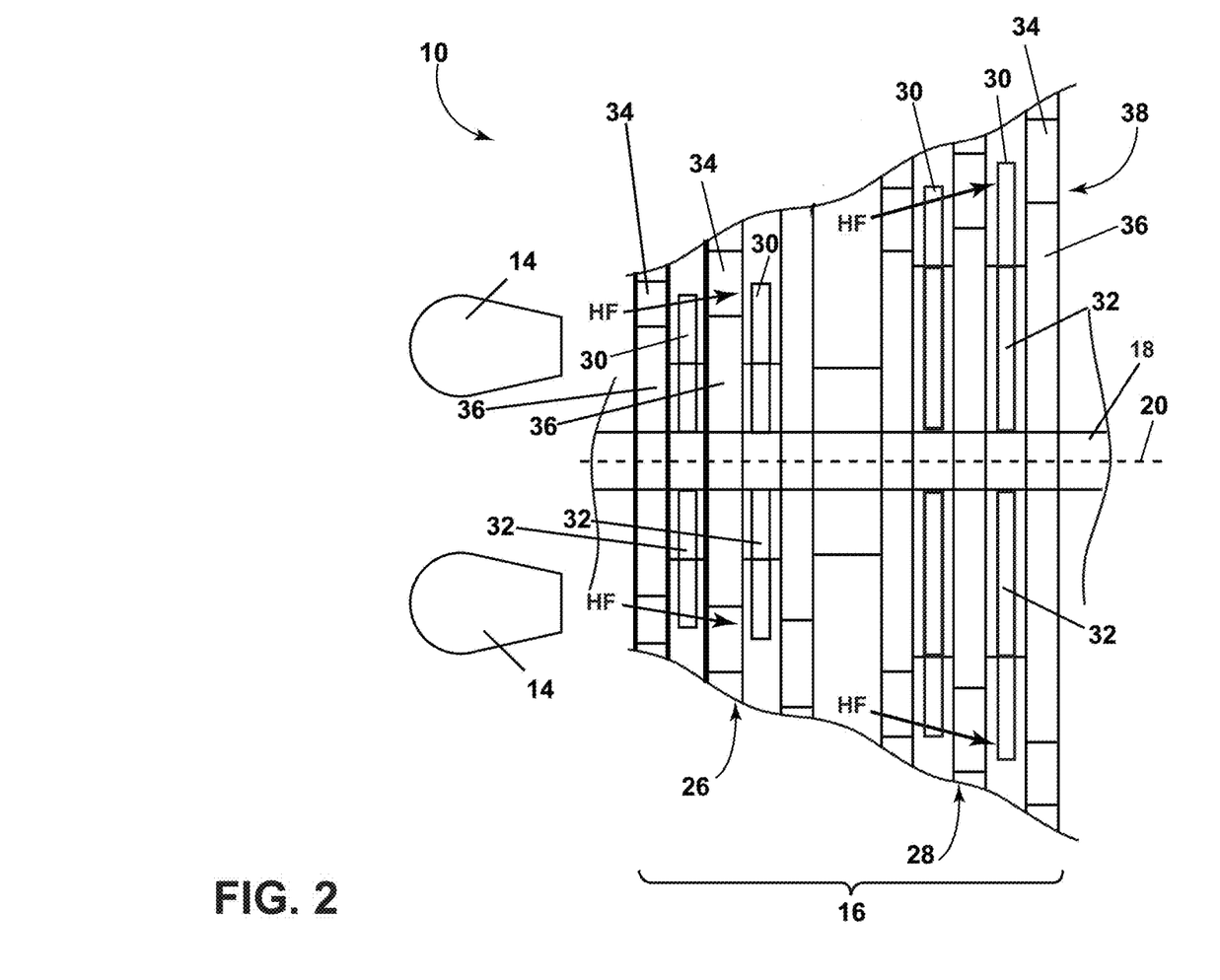
FIG. 2 is a schematic cross-sectional view of a turbine section of the gas turbine engine of FIG. 1, in accordance with an exemplary embodiment of the present disclosure.

Turning to FIG. 2, a portion of the turbine section 16 is schematically illustrated. The turbine section 16 includes sets of blade assemblies 30 circumferentially mounted to corresponding disks 32. The number of individual blade assemblies of the set of blade assemblies 30 mounted to each disk 32 may vary. While shown schematically in FIG. 2, it should be understood that the turbine section 16 can be a single stage turbine, or can include additional stages as shown.

Stationary vane assemblies 34 are mounted to a stator ring 36 located distally exterior of each of the disks 32. A nozzle 38 is defined by the space between circumferentially-adjacent pairs of vane assemblies 34. The number of nozzles 38 provided on the stator ring 36 may vary.

During operation of the gas turbine engine 10, a flow of hot gas or heated fluid flow (denoted "HF") exits the combustor 14 and enters the turbine section 16. The heated fluid flow HF is directed through the nozzles 38 and impinges on the blade assemblies 30, which rotates the blade assemblies 30 circumferentially around the engine centerline 20 and cause rotation of the drive shaft 18. The engine core is configured to generate a redline exhaust gas temperature (EGT) in a range of 988 degrees Celsius (° C.) to 1120° C.

Figure 3:
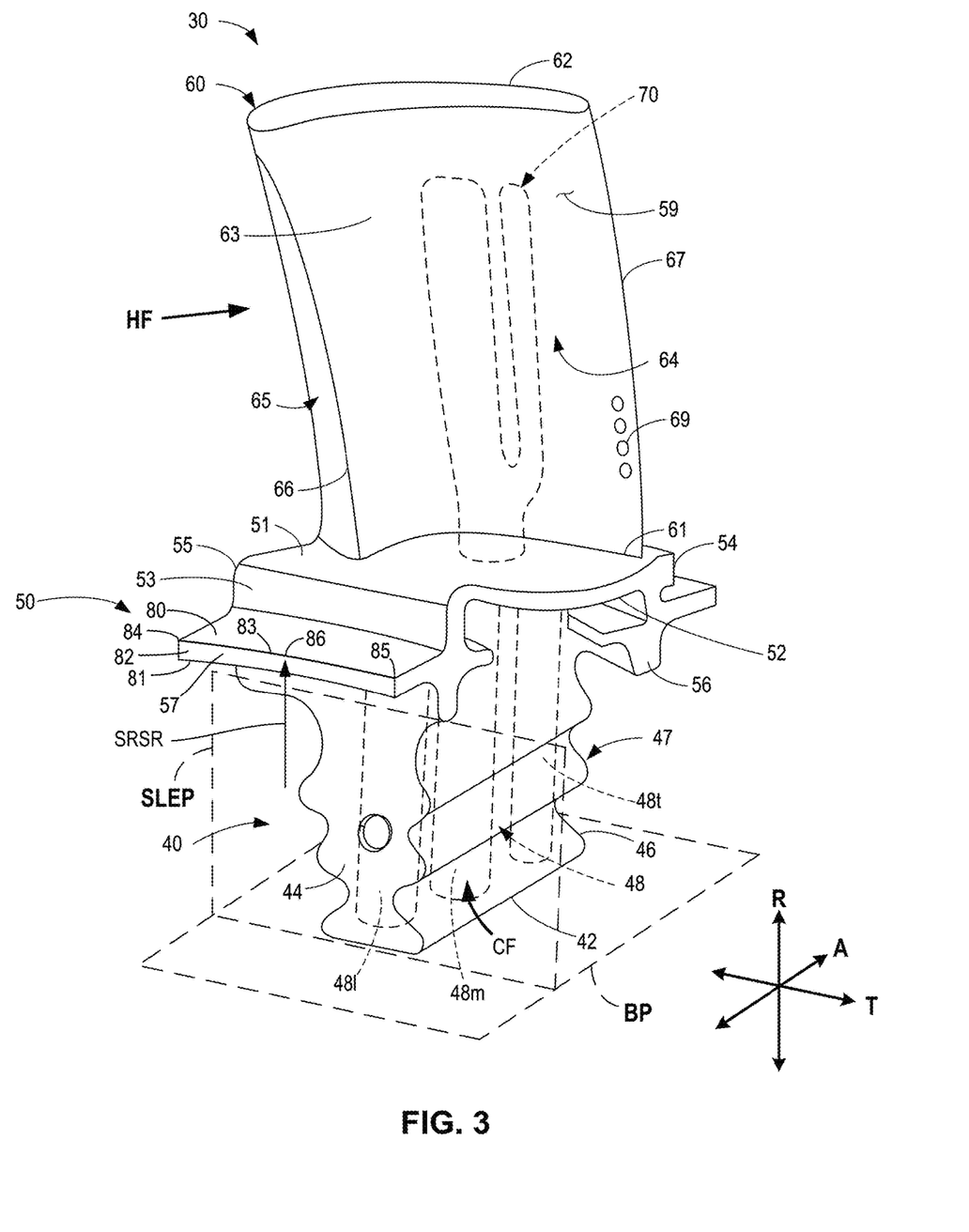
FIG. 3 is a perspective view of a blade assembly for use in the gas turbine engine of FIG. 1, in accordance with an exemplary embodiment of the present disclosure.

FIG. 3 is a perspective view of a single blade assembly 30 for the gas turbine engine 10 (FIG. 1). The blade assembly 30 may correspond to a stage one blade assembly of the HP turbine 26. The blade assembly 30 includes a shank 40, a platform 50, and an airfoil 60 (also referred to as a blade or blade portion). The blade assembly 30 can be constructed as a single unitary part or component (e.g., a monolithic structure). In other examples, the shank 40, the platform 50, and/or the airfoil 60 can be constructed as separate parts or components that are coupled together to form the blade assembly 30.

A directional reference system is illustrated in FIG. 3. The shank 40 extends between a base 42 and the platform 50. The base 42 of the shank 40 is a flat surface that defines a plane, referred to herein as the base plane (denoted "BP"). A radial direction (denoted "R") of the blade assembly 30 is a direction that is perpendicular to the base plane BP. Further, the shank 40 extends between a shank leading-edge 44 and a shank trailing-edge 46. The shank leading-edge 44 is a flat surface that defines a plane, referred herein as the shank leading-edge plane (denoted "SLEP"). An axial direction (denoted "A") of the blade assembly 30 is a direction that is perpendicular to the shank leading-edge plane SLEP. A tangential direction (denoted "T") is a direction perpendicular to both the radial direction R and the axial direction A.

The shank 40 is configured, by way of non-limiting example as a dovetail 47, to mount to the disk 32 (FIG. 2) of the engine 10 in order to rotatably drive the blade assembly 30. The shank 40 includes a plurality of inlet passages 48 (shown in dashed lines) for receiving a cooling fluid (denoted "CF") (e.g., bleed air) for cooling the blade assembly 30. In the illustrated example, the plurality of inlet passages 48 includes a leading-edge inlet passage 48*l*, a middle inlet passage 48*m*, and a trailing-edge inlet passage 48*t*. Each of the inlet passages 48*l*, 48*m*, 48*t* extends between the base 42 and one or more cooling conduits in the airfoil 30, disclosed in further detail herein. The inlet passages 48*l*, 48*m*, 48*t* receive the cooling fluid CF at the base 42. The cooling fluid CF flows through the inlet passages 48*l*, 48*m*, 48*t* and into the one or more cooling conduits in the airfoil 30. While in this example there are three inlet passages, in other examples, the shank 40 can include more or fewer inlet passages.

The airfoil 60 extends radially outward from the platform 50 to define a root 61, connected to the platform 50, and a tip 62 opposite the root 61. Additionally, the airfoil 60 includes an outer wall 63 defining an exterior surface 59 defining a pressure side 64 and a suction side 65 opposite the pressure side 64. The airfoil 60 extends between an airfoil leading-edge 66 and an airfoil trailing-edge 67 downstream from the airfoil leading-edge 66. The airfoil leading-edge 66 and the airfoil trailing-edge 67 separate the pressure side 64 from the suction side 65. In the illustrated example, the blade assembly 30 has a plurality of cooling conduits 70 (shown in dashed lines) formed within the airfoil 60. Further, the blade assembly 30 has one or more cooling holes 69 formed in the outer wall 63 of the airfoil 60 to fluidly couple the plurality of cooling conduits 70 within the airfoil 60 to an exterior of the blade assembly 30. In the illustrated example, the cooling holes 69 are near the airfoil trailing-edge 67 along the pressure side 64. In other examples, the cooling holes 69 can be disposed in other locations. The plurality of cooling conduits 70 can include multiple conduits that extend radially through the airfoil 60. In some examples, one or more of the cooling conduits 70 are fluidly coupled to certain ones of the inlet passages 48*l*, 48*m*, 48*t*.

The platform 50 has a first surface 51, referred to as an upper surface, and a second surface 52, referred to as a lower surface, opposite the upper surface 51. The airfoil 60 is coupled to and extends radially outward from the upper surface 51, and the shank 40 is coupled to and extends radially inward from the lower surface 52. The platform 50 extends between a platform leading-edge 53 and a platform trailing-edge 54, opposite the platform leading-edge 53, in the axial A direction. The platform 50 further extends between a first slashface 55 and a second slashface 56, opposite the first slashface 55, in the tangential T direction. When assembled, consecutive blade assemblies 30 are arranged in a circumferential direction about the engine centerline 20 (FIG. 1) with sequential slashfaces 55, 56 facing each other.

During operation of the gas turbine engine 10, the heated fluid flow HF flows along the blade assembly 30. The airfoil leading-edge 66 is defined by a stagnation point with respect to the heated fluid flow HF. The heated fluid flow HF flows generally in the axial direction, from forward to aft, while the local directionality can vary as the heated fluid flow HF is driven or turned within the engine 10. The cooling fluid flow CF is supplied to the plurality of inlet passages 48 and flows into the plurality of cooling conduits 70 to cool the airfoil 60. The cooling fluid flow CF is provided throughout the airfoil 60 and exhausted from the plurality of cooling conduits 70 via the cooling holes 69 as a cooling film. Multiple blade assemblies 30 are arranged circumferentially such that the platforms 50 of the blade assemblies 30 form a substantially continuous ring. The platform 50 helps to radially contain the heated fluid flow HF to protect the disk 32 (FIG. 2). In particular, the platform 50 acts to seal the space radially inward of the platform 50 between the flow path of the heated fluid flow H and the disk 32. The disk 32 requires significant cooling to ensure the durability of the HP turbine 26 components.

Materials used to form the blade assembly 30 include, but are not limited to, steel, refractory metals such as titanium, or superalloys based on nickel, cobalt, or iron, ceramic matrix composites, or combinations thereof. The structures can be formed by a variety of methods, including additive manufacturing, casting, electroforming, or direct metal laser melting, in non-limiting examples.

Figure 4:
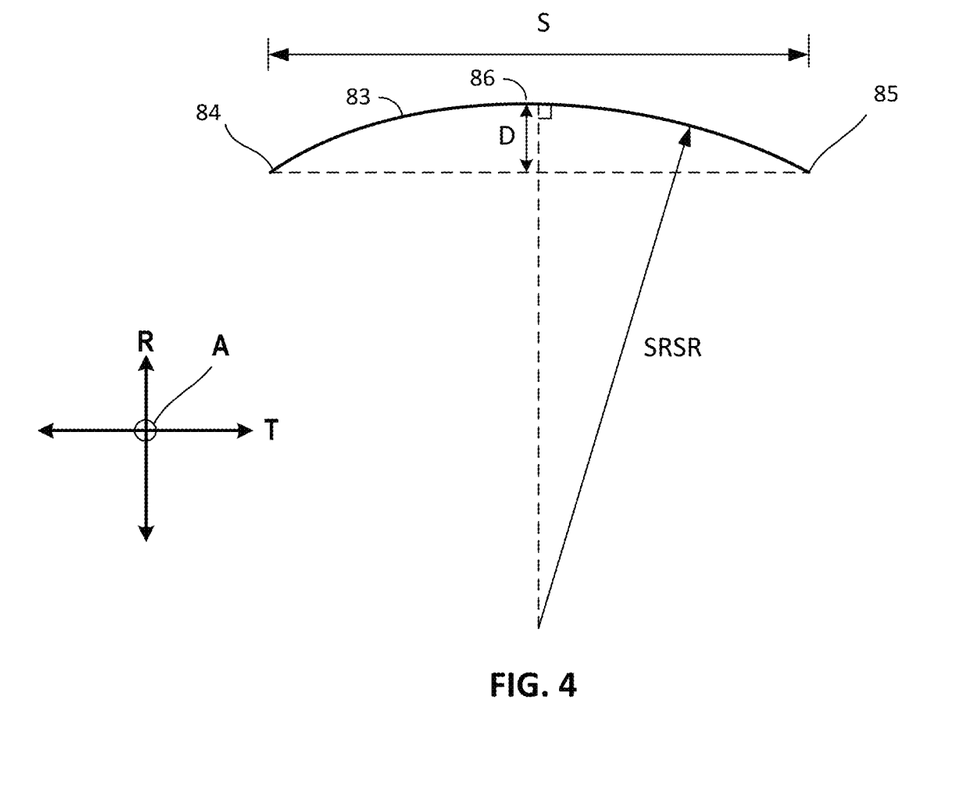
FIG. 4 is a schematic used to calculate a stator rotor seal radius of the blade assembly of FIG. 3.

As shown in FIG. 3, the platform 50 has a stator rotor seal 57 that extends axially forward from the platform leading-edge 53. The stator rotor seal 57 facilitates sealing of a forward buffer cavity (not shown) defined within the rotor assembly. The stator rotor seal 57 has an upper surface 80, a lower surface 81 opposite the upper surface 80, and a forward surface 82 between the upper surface 80 and the lower surface 81. The stator rotor seal 57 has an upper edge 83 between the upper surface 80 and the forward surface 82. The upper edge 83 is curved or arc-shaped. In particular, the upper edge 83 is curved between a first end point 84 at the first slashface 55 and a second end point 85 at the second slashface 56. The upper edge 83 of stator rotor seal 57 has a center point 86 that forms the peak of the arc. The upper edge 83 of the stator rotor seal 57 has a radius of curvature, referred to herein as a stator rotor seal radius (denoted "SRSR"). The center of the radius of curvature may be the engine centerline 20 (FIG. 1). As shown in FIG. 4, the SRSR (i.e., the radius of curvature of the upper edge 83 of the stator rotor seal 57) can be calculated using the straight-line distance(S) between the two the end points 84, 85, and the maximum deflection (D), in the radial R direction, between the two end points 84, 85 and the center point 86 of the arc. The SRSR can be calculated using SRSR=$(D/2)+(S^2/(8\times D))$.

Figure 5:
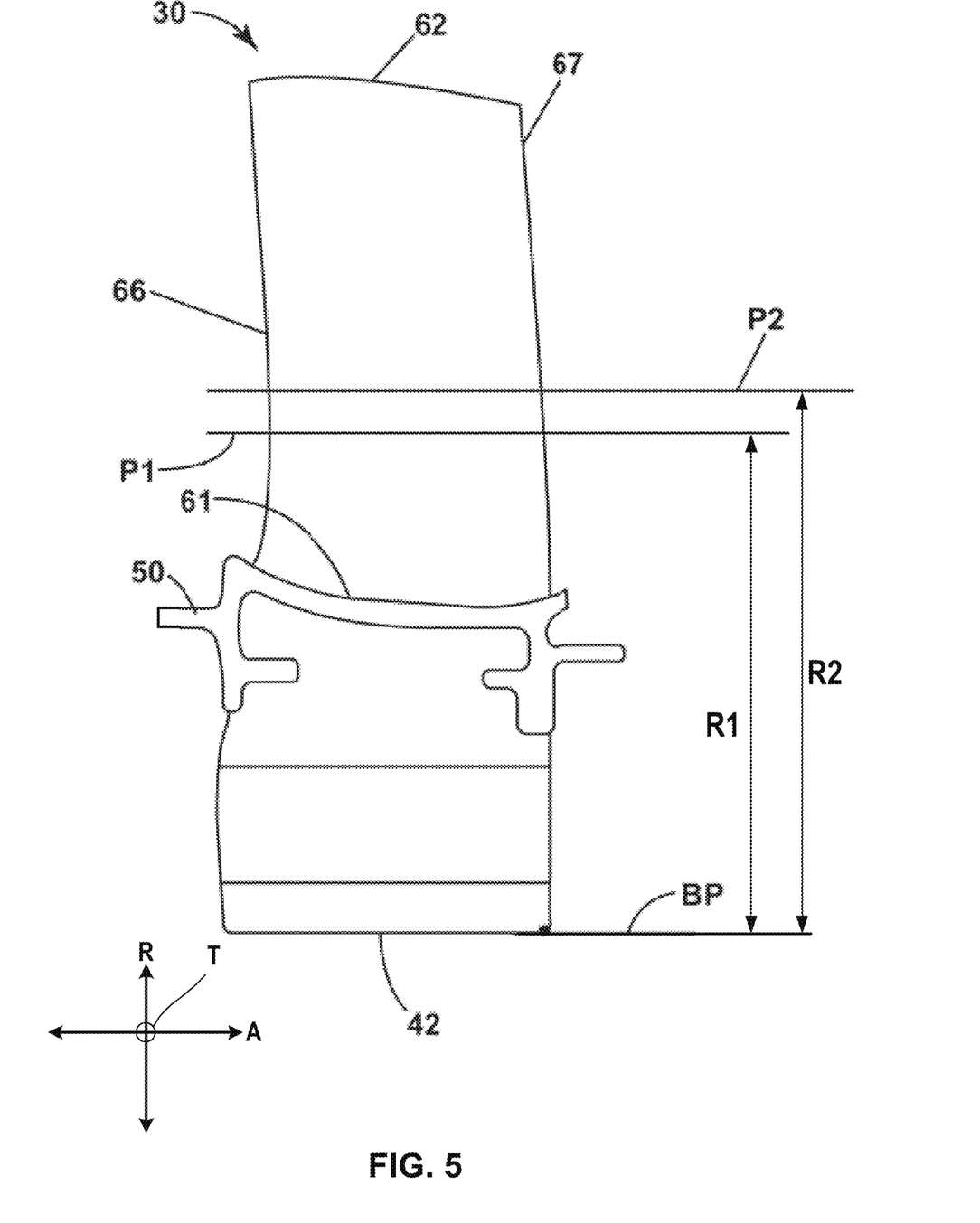
FIG. 5 is a side view of the blade assembly of FIG. 3 showing multiple planes, in accordance with an exemplary embodiment of the present disclosure.

FIG. 5 is a side view of the blade assembly 30. As disclosed above, the base plane BP is a plane defined by the base 42 and is perpendicular to the radial direction R. A first plane (denoted "P1") is parallel to the base plane BP and is located at a first radial distance (denoted "R1") from the base plane BP. A second plane (denoted "P2") is parallel to the base plane BP is located at a second radial distance (denoted "R2") from the base plane BP. Each of the first plane P1, the second plane P2, and the base plane BP extend perpendicular to the radial direction R. The first radial distance (R1) is 0.04002 meters and the second radial distance (R2) is 0.04764 meters. The platform 50, the root 61, the tip 62, the airfoil leading-edge 66, and the airfoil trailing-edge 67 are labeled in FIG. 5.

Figure 6:
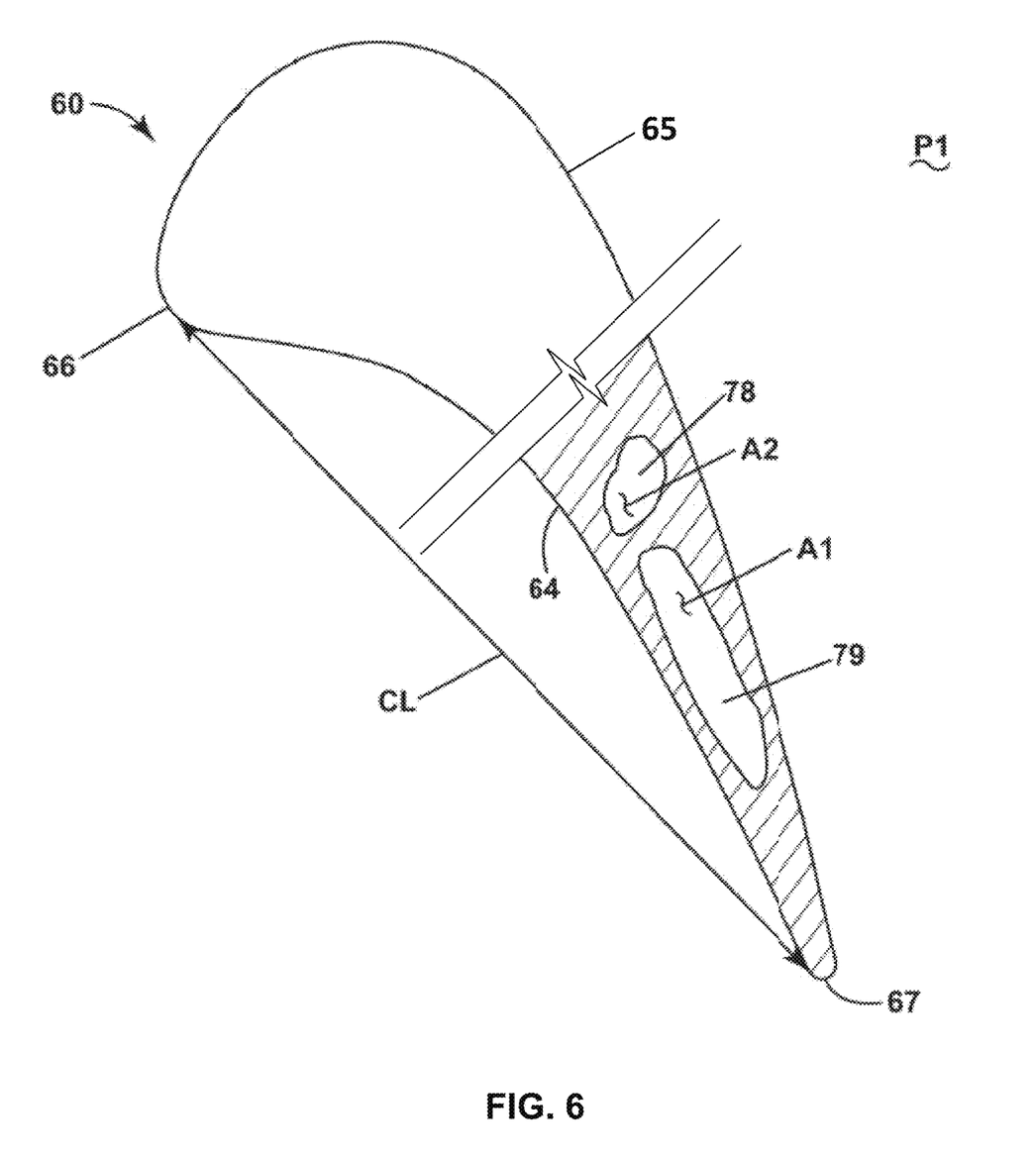
FIG. 6 is a top cross-sectional view of the blade assembly taken along a first plane of the multiple planes from FIG. 5.

FIG. 6 is a cross-sectional view of the airfoil 60 taken along the first plane P1 of FIG. 5. The first plane P1 is taken at the first radial distance (R1) of 0.04002 meters from the base plane BP (FIG. 5). The airfoil 60 extends between the airfoil leading-edge 66 and the airfoil trailing-edge 67 to define a chord length (denoted "CL") therebetween. In the illustrated example, the plurality of cooling conduits 70 includes a first cooling conduit 79 and a second cooling conduit 78. The first cooling conduit 79 is the cooling conduit that is closest to the trailing-edge 67 of the plurality of cooling conduits 70, and the second cooling conduit 78 is the next or second closet cooling conduit to the trailing-edge 67. The airfoil 60 can also include one or more cooling conduits (not shown) in the forward section near the airfoil leading-edge 66. The first cooling conduit 79 is fluidly coupled to the trailing-edge inlet passage 48t (FIG. 3). The second cooling conduit 78 is fluidly coupled to the middle inlet passage 48m (FIG. 3). In some examples, there may be cross-flow between the first and second cooling conduits 78, 79.

Each cooling conduit in the plurality of cooling conduits 70 defines a cross-sectional area in the first plane P1. In particular, the first cooling conduit 79 has a first cross-sectional area (denoted "A1") in the first plane P1, and the second cooling conduit 78 has a second cross-sectional area (denoted "A2") in the first plane P1. As can be appreciated, the size of the cross-sectional areas of the first and second cooling conduits 78, 79 affects the wall thickness of the airfoil 60, and also affects the flow of cooling fluid CF (FIG. 3).

Figure 7:
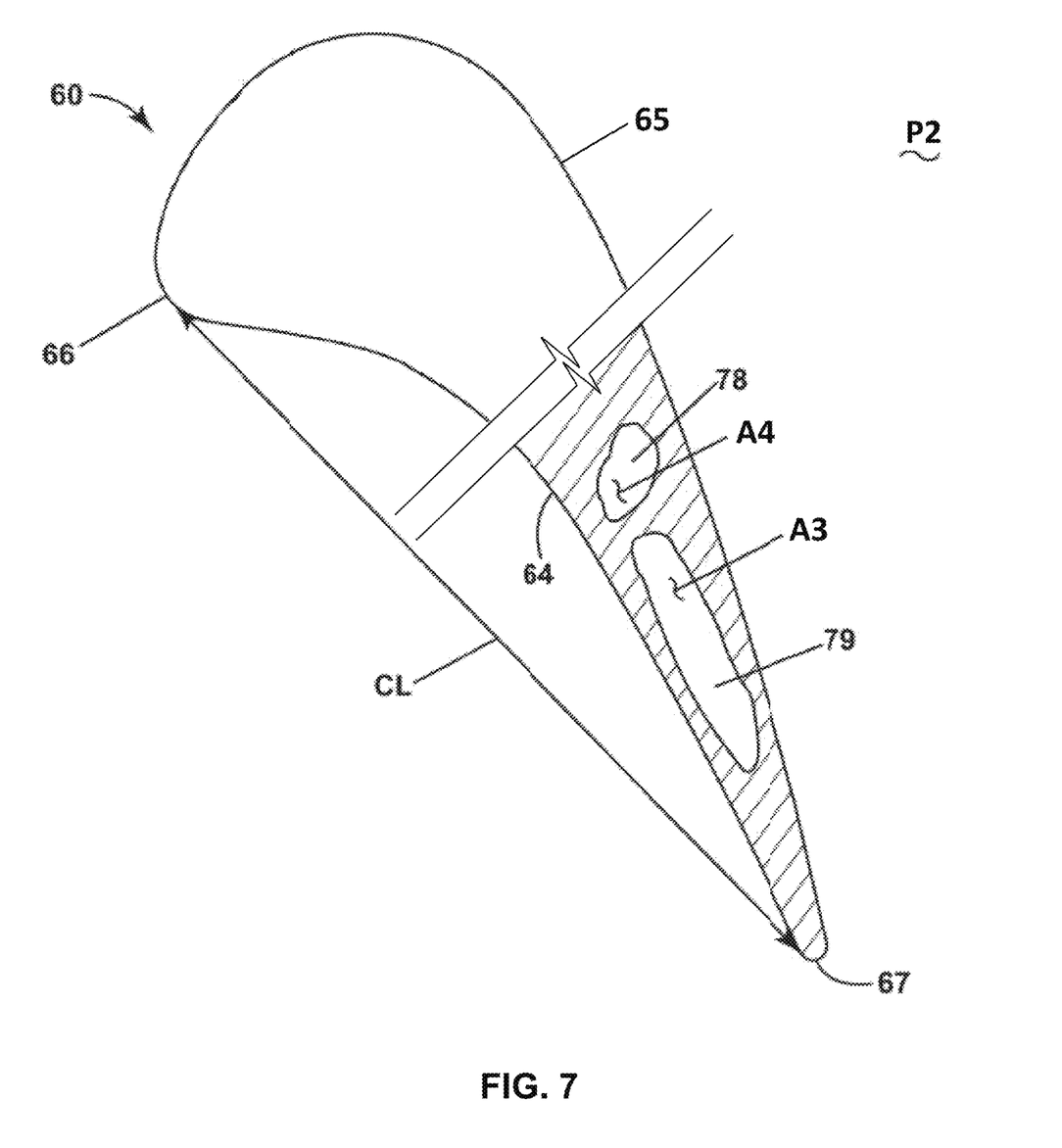
FIG. 7 is a top cross-sectional view of the blade assembly taken along a second plane of the multiple planes from FIG. 5.

FIG. 7 is a cross-sectional view of the airfoil 60 taken along the second plane P2 of FIG. 4. The second plane P2 is taken at the second radial distance (R2) of 0.04764 meters from the base plane BP (FIG. 5). Each cooling conduit in the plurality of cooling conduits 70 defines a cross-sectional area in the second plane P2. In particular, the first cooling conduit 79 has a third cross-sectional area (denoted "A3") in the second plane P2, and the second cooling conduit 78 has a fourth cross-sectional area (denoted "A4") in the second plane P2.

The blade assemblies 30 of the HP turbine 26 and, specifically, the stage one blade assemblies 30 of the HP turbine 26 have the highest flow path temperature of any blade set. These stage one blade assemblies also rotate at extremely high angular velocities. The extreme temperature environment and the high rotational speeds impart large forces on the stage one blade assemblies 30 that can lead to creep and fatigue, especially along the suction side of the airfoil. Creep and fatigue may result in an unexpected or premature part replacement that limits engine Time on Wing (TOW). Therefore, there is a need for a blade assembly with high durability that can withstand these large centrifugal stresses and reduce (e.g., minimize) creep and fatigue.

The inventors developed multiple blade assembly designs and determined that the sizes of the first cooling conduit 79 and of the second cooling conduit 78 have a significant effect on the durability (e.g., creep and fatigue resistance) of the blade assembly 30 for a given redline EGT. In particular, the inventors determined the cross-sectional areas A1, A2, A3, A4 of the second cooling conduit 78 and the first cooling conduit 79 (taken at the first radial distance R1 is equal to 0.04002 meters and the second radial distance R2 is equal to 0.04764 meters) for a specific set of operating characteristics represented by redline EGT affect blade assembly stresses. More specifically, the inventors determined an average of the first and third cross-sectional areas A1 and A3 of the first cooling conduit 79, referred to herein as the trailing-edge area TEA, and an average of the second and fourth areas A2 and A4 of the second cooling conduit 78, referred to herein as the secondary area SA, have an effect on the durability. In general, increasing the trailing-edge area TEA and secondary area SA values result in a thinner airfoil wall, which can increase susceptibility to creep, but allows more cooling fluid, which can provide resistance to fatigue. Conversely, decreasing the trailing-edge area TEA and the secondary area SA increases a local thickness of the outer wall 63, thus improving load bearing capability at the airfoil trailing-edge 67, but results in less cooling fluid and, therefore, increases susceptibility to fatigue. Balancing this decrease with the reduction in cooling flow to these cavities results in a hotter trailing edge temperature with greater load bearing capability. In other words, effectively a smaller cavity means less cooling flow within the cavity, thus an increase in temperature. The increased temperature is balanced with the wall thickness to produce a more durable part.

Further, the inventors determined, through developing multiple blade assembly designs, that the size of the stator rotor seal radius (SRSR) has a significant effect on the durability of the blade assembly 30. The stator rotor seal radius (SRSR) is integral to the airfoil 60 external geometry and characterizes the component height in operation. The airfoil 60 is designed for rotational operation and this stator rotor seal radius (SRSR) relates to the loading characteristics experienced by the airfoil 60. Due to the relationship with airfoil height and rotational operation, the stator rotor seal (SRSR) can be used to characterize the loading and stresses of the airfoil as the primary contributors to airfoil stress are due to rotation, flowpath, and thermal conditions. The stress experienced by the airfoil contributes to component durability.

Therefore, the inventors determined during the course of their blade assembly design that the sizes of cross-sectional areas of interior cooling conduits taken along the planes illustrated in FIGS. 6 and 7, the SRSR of FIGS. 3 and 4, and the redline EGT have an effect on the durability of the blade assembly 30.

As stated above, the inventors created solutions with relatively high blade durability (e.g., reduced creep and fatigue, absence of crack formation or propagation after a number of engine cycles) for a defined engine environment. Table 1 below illustrates eighteen examples (denoted Ex. 1-18) of gas turbine engines 10 and blade assemblies 30 developed by the inventors. Table 1 includes TEA values, SA values, SRSR values, and redline EGT values for each of the examples.

TABLE 1

| Parameter Units | TEA (Trailing-Edge Area) m² | SA (Secondary Area) m² | (SRSR) Stator Rotor Seal Radius m | Redline EGT (Redline Exhaust Gas Temperature) ° C. |
|---|---|---|---|---|
| Ex. 1 | 0.00000624 | 0.00000475 | 0.227 | 993.918 |
| Ex. 2 | 0.00000765 | 0.00000412 | 0.238 | 1065.384 |
| Ex. 3 | 0.00000990 | 0.00000201 | 0.231 | 1003.006 |
| Ex. 4 | 0.00000564 | 0.00000476 | 0.238 | 1110.958 |
| Ex. 5 | 0.0000100 | 0.0000020 | 0.239 | 1120 |
| Ex. 6 | 0.0000056 | 0.0000048 | 0.224 | 988 |
| Ex. 7 | 0.0000078 | 0.0000036 | 0.236 | 1074 |
| Ex. 8 | 0.0000064 | 0.0000047 | 0.226 | 991 |
| Ex. 9 | 0.0000100 | 0.0000031 | 0.235 | 1100 |
| Ex. 10 | 0.0000056 | 0.0000028 | 0.236 | 990 |
| Ex. 11 | 0.0000072 | 0.0000020 | 0.234 | 1050 |
| Ex. 12 | 0.0000061 | 0.0000048 | 0.237 | 1105 |
| Ex. 13 | 0.0000074 | 0.0000037 | 0.236 | 1043 |
| Ex. 14 | 0.0000084 | 0.0000025 | 0.224 | 1000 |
| Ex. 15 | 0.00000374 | 0.00000484 | 0.238 | 1088 |
| Ex. 16 | 0.00000523 | 0.00000600 | 0.231 | 1105 |
| Ex. 17 | 0.00000483 | 0.00000520 | 0.224 | 1120 |
| Ex. 18 | 0.00000501 | 0.00000561 | 0.229 | 1089 |

The inventors found that blade assembly designs with parameters defined in Examples 1-14 exhibit relatively high structural integrity and durability while remaining within current engine constraints. Conversely, Examples 15-18 have relatively low durability for the particular engine environment.

The examples developed by the inventors shown in Table 1 can be characterized by an Expression (EQ) that can be used to distinguish those designs in Examples 1-14 that meet the performance (durability) requirements from those designs in Examples 15-18 that do not meet the performance requirements. As such, the Expression (EQ) can be used to identify an improved blade assembly design, better suited for a particular engine operating environment and taking into account the constraints imposed on blade assembly design with cooling holes used in such a system.

The Expression (EQ) is defined as:

$$EQ = \frac{\left[100 * \left(\frac{TEA(m^2)}{0.005 \text{ m}^2}\right)^{-2}\left(\frac{SA(m^2)}{0.005 \text{ m}^2}\right)^{2}\right]}{\left[0.17 * \left(\frac{\text{Redline } EGT(° C.)}{500° C.}\right)\left(\frac{SRSR(m)}{1 \text{ m}}\right)\right]}$$

TEA represents the average of the first and third cross-sectional areas A1, A3 of the first cooling conduit 79 shown in FIGS. 6 and 7. SA represents the average of the second and fourth cross-sectional areas A2, A3 of the second cooling conduit 78 shown in FIGS. 6 and 7. SRSR represents the stator rotor seal radius shown in FIGS. 3 and 4. Redline EGT represents the redline exhaust gas temperature for the gas turbine engine 10.

Values for the Expression (EQ) for each of the examples of Table 1 are shown in Table 2.

TABLE 2

| Parameter Units | TEA (Trailing-Edge Area) m² | SA (Secondary Area) m² | SRSR (Stator Rotor Seal Radius) m | Redline EGT (Redline Exhaust Gas Temperature) ° C. | Expression (EQ) n/a |
|---|---|---|---|---|---|
| Ex. 1 | 0.00000624 | 0.00000475 | 0.227 | 993.918 | 755.375 |
| Ex. 2 | 0.00000765 | 0.00000412 | 0.238 | 1065.384 | 336.441 |
| Ex. 3 | 0.00000990 | 0.00000201 | 0.231 | 1003.006 | 52.327 |
| Ex. 4 | 0.00000564 | 0.00000476 | 0.238 | 1110.958 | 792.323 |
| Ex. 5 | 0.0000100 | 0.0000020 | 0.239 | 1120 | 43.951 |
| Ex. 6 | 0.0000056 | 0.0000048 | 0.224 | 988 | 976.388 |
| Ex. 7 | 0.0000078 | 0.0000036 | 0.236 | 1074 | 248.763 |
| Ex. 8 | 0.0000064 | 0.0000047 | 0.226 | 991 | 716.508 |
| Ex. 9 | 0.0000100 | 0.0000031 | 0.235 | 1100 | 109.341 |
| Ex. 10 | 0.0000056 | 0.0000028 | 0.236 | 990 | 314.712 |
| Ex. 11 | 0.0000072 | 0.0000020 | 0.234 | 1050 | 92.366 |
| Ex. 12 | 0.0000061 | 0.0000048 | 0.237 | 1105 | 695.398 |
| Ex. 13 | 0.0000074 | 0.0000037 | 0.236 | 1043 | 298.835 |
| Ex. 14 | 0.0000084 | 0.0000025 | 0.224 | 1000 | 116.304 |
| Ex. 15 | 0.00000374 | 0.00000484 | 0.238 | 1088 | 1902.229 |
| Ex. 16 | 0.00000523 | 0.00000600 | 0.231 | 1105 | 1516.512 |
| Ex. 17 | 0.00000483 | 0.00000520 | 0.224 | 1120 | 1358.837 |
| Ex. 18 | 0.00000501 | 0.00000561 | 0.229 | 1089 | 1478.388 |

Based on the Expression (EQ) values of Examples 1-14 in Table 2, it was determined that gas turbine engine and blade assembly designs with an EQ value in the range of 43.951 to 976.388 (i.e., 43.951≤EQ≤976.388) advantageously meet the durability requirements while remaining within desired tolerances and being capable of use in existing engine systems.

Benefits are realized when the manufactured component including the blade assembly 30 have a geometry where Expression (EQ) falls within the range 43.951 to 976.388 (i.e., 43.951≤EQ≤976.388). Such benefits include a reduction in stress at the airfoil trailing-edge 67, which increases the lifetime of the blade assembly 30 and therefore extends the time between a need for replacement parts. This provides for increased durability for the blade assembly 30, which decreases required maintenance and costs, while increasing overall engine reliability.

Further still, the benefits included herein provide for a blade assembly 30 that fits within existing engines. For example, the values for Expression (EQ) as provided herein take existing engines into consideration, permitting replacement of current blade assemblies with replacement blade assemblies (or new blade assemblies) having the parameters of the blade assembly 30 described herein. Such consideration provides for replacing and improving current engine systems without requiring the creation of new engine parts capable of holding the blade assembly 30. This provides for improving current engine durability without increasing costs to prepare new engines or further adapt existing engines.

Table 3 below illustrates minimum and maximum values for the trailing-edge area TEA, the secondary area SA, the stator rotor seal radius SRSR, and the redline exhaust gas temperature EGT along with a range of values for Expression (EQ) suited for a blade assembly that meets the durability requirements.

TABLE 3

| Parameter: | Element: | Minimum: | Maximum: | Units: |
|---|---|---|---|---|
| TEA | Trailing-Edge Area | 0.0000056 | 0.00001 | Meters squared (m$^2$) |
| SA | Secondary Area | 0.000002 | 0.0000048 | Meters squared (m$^2$) |
| SRSR | Stator Rotor Seal Radius | 0.224 | 0.239 | Meters (m) |
| Redline EGT | Redline Exhaust Gas Temperature | 988 | 1120 | Degrees Celsius (° C.) |
| EQ | Expression | 43.951 | 976.388 | n/a |

Additional benefits associated with the blade assembly 30 with the second cooling conduit 78 and the first cooling conduit 79 and the stator rotor seal 57 described herein include a quick assessment of design parameters in terms of blade assembly size and cooling conduit geometry, engine operational conditions, and blade and vane assembly numbers for engine design and particular blade design. Narrowing these multiple factors to a region of possibilities saves time, money, and resources. The blade assembly 30 with the second cooling conduit 78 and the first cooling conduit 79 and the stator rotor seal 57 described herein enables the development and production of high-performance turbine engines and blade assemblies across multiple performance metrics within a given set of constraints.

As noted above, designs such as Examples 15-18 of Tables 1 and 2 were found to have relatively low durability for a particular engine environment. This is reflected in the associated Expression (EQ) value outside the range of 43.951 to 976.388. Lower durability results in less time on wing (TOW) and greater maintenance costs.

Additionally or alternatively, designs outside the range of EQ may attempt to increase durability by making sacrifices in terms of weight, aerodynamic performance, and efficiency. For example, the standard practice for solving the problem of improving blade assembly durability has been to utilize stronger material. However, such materials lead to increased costs, system weight, and overall space occupied by the blade assembly. Using a cost-benefit analysis, the overall engine efficiency may be reduced and related components may have to be redesigned to compensate for the stronger materials. In some cases, this result of such a cost-benefit analysis is impractical or impossible. Therefore, a solution for reducing stresses located in airfoils presently used in existing engines is needed, without requiring redesign of related components or without sacrificing overall engine efficiency.

In other examples, increasing size of the airfoil or related components, utilizing stronger material, and/or providing additional cooling features can combat centrifugal and thermal stresses. However, such increased size, stronger materials, and additional cooling features can lead to increased costs, system weight, overall space occupied by the blade assembly, and performance loss, as well as increased local stresses at the cooling conduits due to increased weight and size relating to the centrifugal forces. Increased cooling features results in a relatively less amount of material utilized, which can result in an increase in local stresses at the cooling conduits. Therefore, a solution for reducing stresses at the cooling conduits is needed without otherwise increasing stresses, weight, size, or decreasing engine efficiency.

As disclosed above, the inventors have found that the Examples 1-14 of Tables 1 and 2 provide successful solutions without the need to increase thickness, weight, strength, or the number of cooling features. The Examples 1-14 of Tables 1-2 illustrate that designs having an Expression (EQ) value from 43.951 to 976.388 (i.e., 43.951≤EQ≤976.388) achieve increased durability without penalties to size, weight, strength, or stress through the use of additional cooling features. In other words, rather than making areas of the airfoil thicker, or using heavier, stronger materials, or adding additional cooling features, effective stress reduction can be achieved by the Examples 1-14 of Tables 1 and 2.

As disclosed above, the inventors created blade assemblies with relatively high durability (e.g., creep and fatigue resistance) for a defined engine operating environment.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A gas turbine engine, comprising: an engine core configured to generate a redline exhaust gas temperature (EGT) in a range of 988 degrees Celsius (° C.) to 1120° C., the engine core extending along an engine centerline and including: a compressor section; a combustor; and a turbine section, the turbine section including a blade assembly rotatable about the engine centerline, the blade assembly including: a platform having an upper surface and a lower surface, the platform having a stator rotor seal with an upper edge having a radius of curvature defined as a stator rotor seal radius (SRSR), wherein the stator rotor seal radius (SRSR) is 0.224 to 0.239 meters; an airfoil coupled to the upper surface of the platform, the airfoil having an outer wall defining an exterior surface, the exterior surface defining a pressure side and a suction side, the outer wall extending between a leading-edge and a trailing-edge; a shank coupled to the lower surface, the shank having a base defining a base plane; and a plurality of cooling conduits located within the airfoil, the plurality of cooling conduits including: a first cooling conduit located closest to the trailing-edge and defining a trailing-edge area (TEA), wherein the trailing-edge area (TEA) is from 0.0000056 square-meters ($m^2$) to 0.00001 $m^2$; and a second cooling conduit next to the first cooling conduit and defining a secondary area (SA), wherein the secondary area (SA) is from 0.000002 $m^2$ to 0.0000048 $m^2$, and wherein, $$43.951 \le \frac{\left[100*\left(\frac{TEA1(m^2)}{0.005\ m^2}\right)^{-2}\left(\frac{SA(m^2)}{0.005\ m^2}\right)^2\right]}{\left[0.17*\left(\frac{\text{Redline } EGT(^\circ\ C.)}{500^\circ\ C.}\right)\left(\frac{SRSR(m)}{1\ m}\right)\right]} \le 976.388.$$

The gas turbine engine of any preceding clause, wherein the trailing-edge area (TEA) is an average of a first cross-sectional area of the first cooling conduit located at a first plane extending through the airfoil at a first radial distance of 0.04002 meters measured from the base plane of the shank and a second cross-sectional area of the first cooling conduit located at a second plane extending through the airfoil at a second radial distance of 0.04764 meters measured from the base plane of the shank.

The gas turbine engine of any preceding clause, wherein the secondary area (SA) is an average of a third cross-sectional area of the second cooling conduit located at the first plane and a fourth cross-sectional area of the second cooling conduit located at the second plane.

The gas turbine engine of any preceding clause, wherein the first cooling conduit and the second cooling conduit are sized to provide the outer wall with a thickness that provides sufficient durability to the blade assembly.

The gas turbine engine of any preceding clause, wherein the shank includes a plurality of inlet passages fluidly coupled to the plurality of cooling conduits.

The gas turbine engine of any preceding clause, wherein each of the inlet passages extends between the base and one or more of the cooling conduits.

The gas turbine engine of any preceding clause, wherein the plurality of inlet passages includes a leading-edge inlet passage, a middle inlet passage, and a trailing-edge inlet passage.

The gas turbine engine of any preceding clause, wherein the first cooling conduit is fluidly coupled to the trailing-edge inlet passage, and the second cooling conduit is fluidly coupled to the middle inlet passage.

The gas turbine engine of any preceding clause, wherein the blade assembly is a stage one blade assembly of a high-pressure turbine of the turbine section.

The gas turbine engine of any preceding clause, wherein the shank is configured as a dovetail.

A blade assembly for a gas turbine engine having an engine core configured to generate a redline exhaust gas temperature (EGT) in a range of 988 degrees Celsius (C) to 1120° C., the blade assembly to be connected to the engine core and rotatable about an engine centerline of the engine core, the blade assembly comprising: a platform having an upper surface and a lower surface, the platform having a stator rotor seal with an upper edge having a radius of curvature defined as a stator rotor seal radius (SRSR), wherein the stator rotor seal radius (SRSR) is 0.224 to 0.239 meters; an airfoil coupled to the upper surface of the platform, the airfoil having an outer wall defining an exterior surface, the exterior surface defining a pressure side and a suction side, the outer wall extending between a leading-edge and a trailing-edge; a shank coupled to the lower surface, the shank having a base defining a base plane; and a plurality of cooling conduits located within the airfoil, the plurality of cooling conduits including: a first cooling conduit located closest to the trailing-edge and defining a trailing-edge area (TEA), wherein the trailing-edge area (TEA) is from 0.0000056 square-meters ($m^2$) to 0.00001 $m^2$; and a second cooling conduit next to the first cooling conduit and defining a secondary area (SA), wherein the secondary area (SA) is from 0.000002 $m^2$ to 0.0000048 $m^2$, and wherein, $$43.951 \le \frac{\left[100*\left(\frac{TEA1(m^2)}{0.005\ m^2}\right)^{-2}\left(\frac{SA(m^2)}{0.005\ m^2}\right)^2\right]}{\left[0.17*\left(\frac{\text{Redline } EGT(^\circ\ C.)}{500^\circ\ C.}\right)\left(\frac{SRSR(m)}{1\ m}\right)\right]} \le 976.388.$$

The blade assembly of any preceding clause, wherein the trailing-edge area (TEA) is an average of a first cross-sectional area of the first cooling conduit located at a first plane extending through the airfoil at a first radial distance of 0.04002 meters measured from the base plane of the shank and a second cross-sectional area of the first cooling conduit located at a second plane extending through the airfoil at a second radial distance of 0.04764 meters measured from the base plane of the shank.

The blade assembly of any preceding clause, wherein the secondary area (SA) is an average of a third cross-sectional area of the second cooling conduit located at the first plane and a fourth cross-sectional area of the second cooling conduit located at the second plane.

The blade assembly of any preceding clause, wherein the first cooling conduit and the second cooling conduit are sized to provide the outer wall with a thickness that provides sufficient durability to the blade assembly.

The blade assembly of any preceding clause, wherein the shank includes a plurality of inlet passages fluidly coupled to the plurality of cooling conduits.

The blade assembly of any preceding clause, wherein each of the inlet passages extends between the base and one or more of the cooling conduits.

The blade assembly of any preceding clause, wherein the plurality of inlet passages includes a leading-edge inlet passage, a middle inlet passage, and a trailing-edge inlet passage.

The blade assembly of any preceding clause, wherein the first cooling conduit is fluidly coupled to the trailing-edge inlet passage, and the second cooling conduit is fluidly coupled to the middle inlet passage.

The blade assembly of any preceding clause, wherein the blade assembly is a stage one blade assembly of a high pressure turbine.

The gas turbine engine of any preceding clause, wherein the shank is configured as a dovetail.

What is claimed is:

1. A gas turbine engine, comprising:
an engine core configured to generate a redline exhaust gas temperature (EGT) in a range of 988 degrees Celsius (C) to 1120° C., the engine core extending along an engine centerline and including:
  a compressor section;
  a combustor; and
  a turbine section, the turbine section including a blade assembly rotatable about the engine centerline, the blade assembly including:
    a platform having an upper surface and a lower surface, the platform having a stator rotor seal with an upper edge having a radius of curvature defined as a stator rotor seal radius (SRSR), wherein the stator rotor seal radius (SRSR) is 0.224 to 0.239 meters;
    an airfoil coupled to the upper surface of the platform, the airfoil having an outer wall defining an exterior surface, the exterior surface defining a pressure side and a suction side, the outer wall extending between a leading-edge and a trailing-edge;
    a shank coupled to the lower surface, the shank having a base defining a base plane; and
    a plurality of cooling conduits located within the airfoil, the plurality of cooling conduits including:
      a first cooling conduit located closest to the trailing-edge and defining a trailing-edge area (TEA), wherein the trailing-edge area (TEA) is from 0.0000056 square-meters (m²) to 0.00001 m²; and
      a second cooling conduit next to the first cooling conduit and defining a secondary area (SA), wherein the secondary area (SA) is from 0.000002 m² to 0.0000048 m², and wherein, $$43.951 \leq \frac{\left[100*\left(\frac{TEA1(m^2)}{0.005\ m^2}\right)^{-2}\left(\frac{SA(m^2)}{0.005\ m^2}\right)^2\right]}{\left[0.17*\left(\frac{\text{Redline } EGT(°\ C.)}{500°\ C.}\right)\left(\frac{SRSR(m)}{1\ m}\right)\right]} \leq 976.388.$$

2. The gas turbine engine of claim 1, wherein the trailing-edge area (TEA) is an average of a first cross-sectional area of the first cooling conduit located at a first plane extending through the airfoil at a first radial distance of 0.04002 meters measured from the base plane of the shank and a second cross-sectional area of the first cooling conduit located at a second plane extending through the airfoil at a second radial distance of 0.04764 meters measured from the base plane of the shank.

3. The gas turbine engine of claim 2, wherein the secondary area (SA) is an average of a third cross-sectional area of the second cooling conduit located at the first plane and a fourth cross-sectional area of the second cooling conduit located at the second plane.

4. The gas turbine engine of claim 1, wherein the first cooling conduit and the second cooling conduit are sized to provide the outer wall with a thickness that provides sufficient durability to the blade assembly.

5. The gas turbine engine of claim 1, wherein the shank includes a plurality of inlet passages fluidly coupled to the plurality of cooling conduits.

6. The gas turbine engine of claim 5, wherein each of the inlet passages extends between the base and one or more of the cooling conduits.

7. The gas turbine engine of claim 6, wherein the plurality of inlet passages includes a leading-edge inlet passage, a middle inlet passage, and a trailing-edge inlet passage.

8. The gas turbine engine of claim 7, wherein the first cooling conduit is fluidly coupled to the trailing-edge inlet passage, and the second cooling conduit is fluidly coupled to the middle inlet passage.

9. The gas turbine engine of claim 1, wherein the blade assembly is a stage one blade assembly of a high-pressure turbine of the turbine section.

10. The gas turbine engine of claim 1, wherein the shank is configured as a dovetail.

11. A blade assembly for a gas turbine engine having an engine core configured to generate a redline exhaust gas temperature (EGT) in a range of 988 degrees Celsius (° C.) to 1120° C., the blade assembly to be connected to the engine core and rotatable about an engine centerline of the engine core, the blade assembly comprising:
  a platform having an upper surface and a lower surface, the platform having a stator rotor seal with an upper edge having a radius of curvature defined as a stator rotor seal radius (SRSR), wherein the stator rotor seal radius (SRSR) is 0.224 to 0.239 meters;
  an airfoil coupled to the upper surface of the platform, the airfoil having an outer wall defining an exterior surface, the exterior surface defining a pressure side and a suction side, the outer wall extending between a leading-edge and a trailing-edge;
  a shank coupled to the lower surface, the shank having a base defining a base plane; and
  a plurality of cooling conduits located within the airfoil, the plurality of cooling conduits including:
    a first cooling conduit located closest to the trailing-edge and defining a trailing-edge area (TEA), wherein the trailing-edge area (TEA) is from 0.0000056 square-meters (m²) to 0.00001 m²; and
    a second cooling conduit next to the first cooling conduit and defining a secondary area (SA), wherein the secondary area (SA) is from 0.000002 m² to 0.0000048 m², and wherein, $$43.951 \leq \frac{\left[100*\left(\frac{TEA1(m^2)}{0.005\ m^2}\right)^{-2}\left(\frac{SA(m^2)}{0.005\ m^2}\right)^2\right]}{\left[0.17*\left(\frac{\text{Redline } EGT(°\ C.)}{500°\ C.}\right)\left(\frac{SRSR(m)}{1\ m}\right)\right]} \leq 976.388.$$

12. The blade assembly of claim 11, wherein the trailing-edge area (TEA) is an average of a first cross-sectional area of the first cooling conduit located at a first plane extending through the airfoil at a first radial distance of 0.04002 meters measured from the base plane of the shank and a second cross-sectional area of the first cooling conduit located at a second plane extending through the airfoil at a second radial distance of 0.04764 meters measured from the base plane of the shank.

13. The blade assembly of claim 12, wherein the secondary area (SA) is an average of a third cross-sectional area of the second cooling conduit located at the first plane and a fourth cross-sectional area of the second cooling conduit located at the second plane.

14. The blade assembly of claim 11, wherein the first cooling conduit and the second cooling conduit are sized to provide the outer wall with a thickness that provides sufficient durability to the blade assembly.

15. The blade assembly of claim 11, wherein the shank includes a plurality of inlet passages fluidly coupled to the plurality of cooling conduits.

16. The blade assembly of claim 15, wherein each of the inlet passages extends between the base and one or more of the cooling conduits.

17. The blade assembly of claim 16, wherein the plurality of inlet passages includes a leading-edge inlet passage, a middle inlet passage, and a trailing-edge inlet passage.

18. The blade assembly of claim 17, wherein the first cooling conduit is fluidly coupled to the trailing-edge inlet passage, and the second cooling conduit is fluidly coupled to the middle inlet passage.

19. The blade assembly of claim 11, wherein the blade assembly is a stage one blade assembly of a high pressure turbine.

20. The blade assembly of claim 11, wherein the shank is configured as a dovetail.

* * * * *